US006939009B2

(12) United States Patent
Fischer et al.

(10) Patent No.: US 6,939,009 B2
(45) Date of Patent: Sep. 6, 2005

(54) COMPACT WORK LIGHT WITH HIGH ILLUMINATION UNIFORMITY

(75) Inventors: Robert E. Fischer, Westlake Village, CA (US); Joseph E. Gortych, Colchester, VT (US)

(73) Assignee: Optics 1, Inc., Westlake Village, CA (US)

(*) Notice: Subject to any disclaimer, the term of this patent is extended or adjusted under 35 U.S.C. 154(b) by 16 days.

(21) Appl. No.: 10/884,759

(22) Filed: Jul. 1, 2004

(65) Prior Publication Data

US 2004/0252281 A1 Dec. 16, 2004

Related U.S. Application Data

(63) Continuation-in-part of application No. 10/794,073, filed on Mar. 5, 2004, which is a continuation-in-part of application No. 10/068,366, filed on Feb. 5, 2002, now Pat. No. 6,746,124.
(60) Provisional application No. 60/266,589, filed on Feb. 6, 2001.

(51) Int. Cl.$^7$ .................... G03B 29/00; G03B 21/14; G03B 21/22; F21L 4/00; F21V 7/00
(52) U.S. Cl. ................ 353/43; 353/20; 353/102; 353/119; 362/187; 362/188; 362/347
(58) Field of Search .................. 353/20, 30, 34, 353/37, 43, 97, 102, 121, 122; 362/187, 188, 157, 347

(56) References Cited

U.S. PATENT DOCUMENTS

| 3,656,845 A | * | 4/1972 | Koch-Bossard et al. ...... 353/42 |
| 6,260,974 B1 | * | 7/2001 | Koyama ...................... 353/98 |
| 6,318,863 B1 | * | 11/2001 | Tiao et al. .................... 353/31 |

* cited by examiner

*Primary Examiner*—David Gray
*Assistant Examiner*—Melissa J Koval
(74) *Attorney, Agent, or Firm*—Opticus IP

(57) ABSTRACT

A compact work light that generates a light beam having high brightness and high illumination uniformity is disclosed. The work light includes a housing that houses a light source, a light homogenizer and an imaging lens in an operational relationship. The housing is attached to an adjustable mount, which can be attached to a fixed region such as wall, or to a movable support member such as a lamp base. The light source generates light that is uniformized by the light homogenizer. The homogenized light is then imaged by the imaging lens as a highly uniform, bright beam spot having a sharp boundary. The beam spot is formed at a selectable distance from the work light by varying the imaging lens and/or the adjustable mount. The work light is useful for a variety of industrial, professional and personal applications, including but not limited to a reading light, a dentist light, a head lamp, a head light and an optical projector.

22 Claims, 15 Drawing Sheets

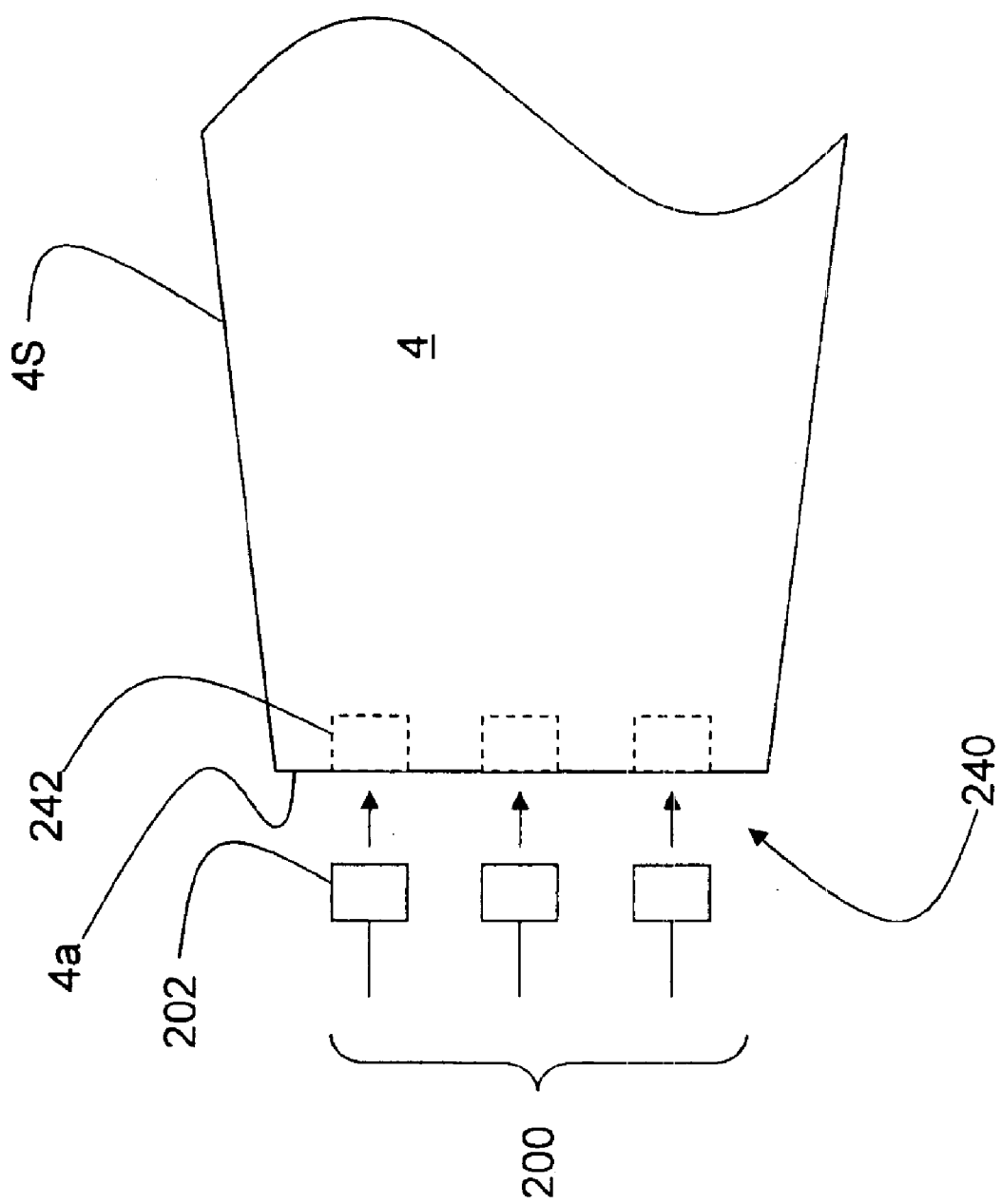

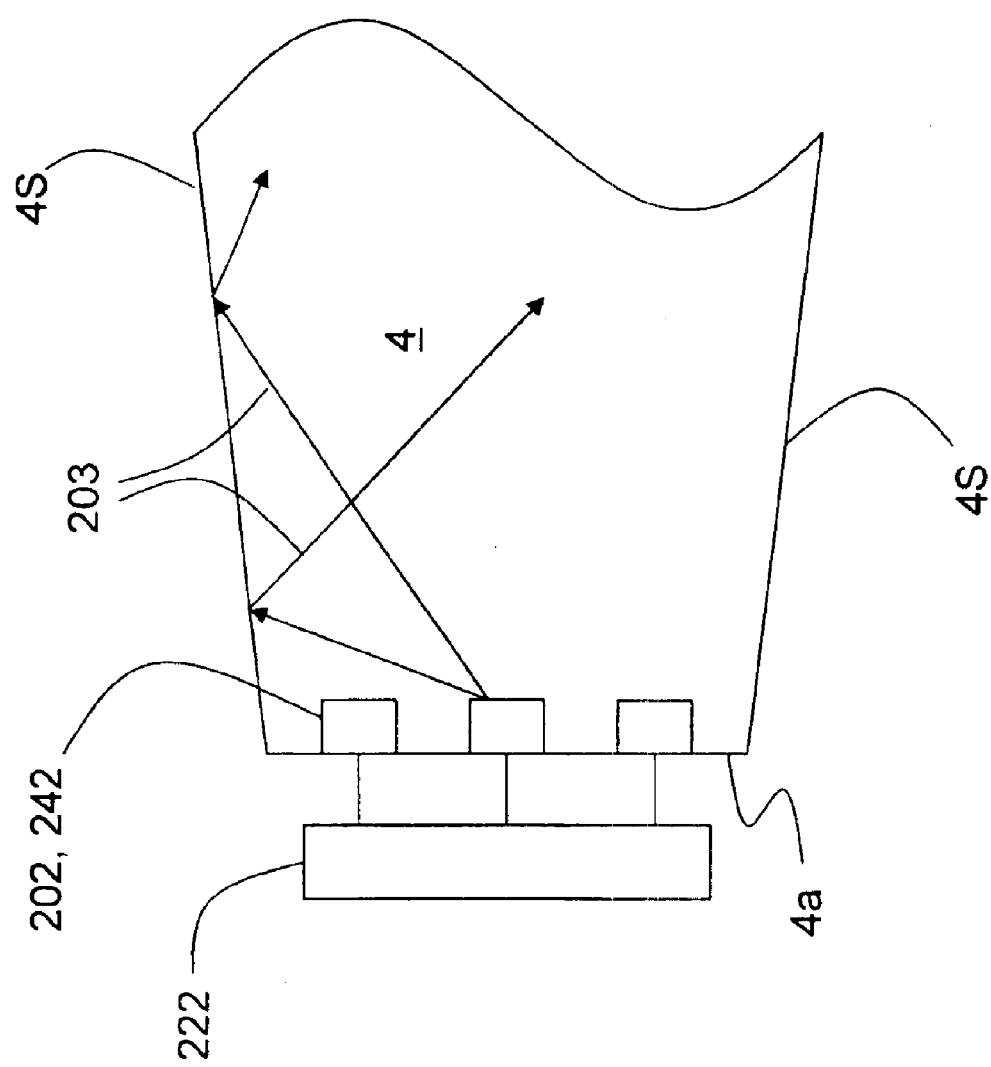

COMPACT WORK LIGHT WITH HIGH ILLUMINATION UNIFORMITY

CROSS-REFERENCE TO RELATED APPLICATIONS

This patent application is a continuation-in-part of U.S. patent application Ser. No. 10/794,073, filed Mar. 5, 2004, which is a continuation-in-part of U.S. patent application Ser. No. 10/068,366, filed Feb. 5, 2002, now U.S. Pat. No. 6,746,124, filed on Feb. 5, 2002, which in turn claims priority from U.S. Provisional Application No. 60/266,589, filed Feb. 6, 2001.

BACKGROUND INFORMATION

1. Field of the Invention

This invention relates to work lights, and in particular to work lights having high brightness and a high degree of illumination uniformity.

2. Description of the Related Art

The flashlight was invented in 1898 by Conrad Hubert who turned a metal tube, a light bulb and a battery into the world's first flashlight. Little has changed in flashlight technology since then. Today's flashlight technology is based on locating a tungsten lamp or bulb at the focus of a parabolic reflector and simply imaging the filament out into object space. The reflector may be of other shapes and may be faceted or otherwise modified. At a somewhat distant wall (such as at a distance of 3–6 feet for example) a crude image of the filament is formed.

A significant problem with the current flashlight technology is that the crude image (usually a circular spot) varies significantly in its intensity. While some flashlights permit the user to vary or adjust the size of the pattern, it is generally highly non-uniform in intensity over the spot. Another problem is that the light spills out to a wide area outside of the intended spot area.

Another problem is that the crude image cast by a conventional flashlight makes it difficult in many circumstances to clearly see the object of interest. This is because the variation in intensity over the illuminating spot can often mask or hide the features of the object of interest.

Another problem is that the illuminated area of prior art flashlights tends to be unattractive and unfamiliar. The illumination people generally experience in their daily lives is designed to be reasonably uniform and have sufficiently high brightness so that objects can be readily seen without eye strain. Unfortunately, conventional flashlights do not provide such illumination.

Many of these same issues relate more generally to work lights (e.g., shop lights, reading lights, dental lights, medical lights head lights, head lamps, etc.) used for a variety of industrial, professional and personal applications. In the cases where such lights attempt to achieve even a modest amount of illumination uniformity, they are usually immense, cumbersome, unwieldy and/or inefficient.

SUMMARY OF THE INVENTION

A first aspect of the invention is a work light for uniformly illuminating an object. The work light includes a light source and a light homogenizer. The light homogenizer is arranged to receive light from the light source at an input face and is adapted to output uniformized light at an output face. In example embodiment, the light homogenizer includes at least one of i) a light pipe and ii) one or more lens arrays. The work light also includes an imaging lens arranged adjacent the output face of the homogenizer. The imaging lens is used to create a light beam that forms an image of the output face on the object at a selectable distance from the imaging lens. In an example embodiment, the image is a uniform beam spot. The work light also includes a housing that houses the light source, the light homogenizer and the imaging lens. The work light further includes a mount attached to the housing and adapted to movably support the housing so as to selectively direct the light beam to the object.

A second aspect of the invention is an optical projector. The optical projector includes a light source and a light homogenizer arranged to receive light from the light source at an input face and adapted to output uniformized light at an output face, wherein the light homogenizer includes i) a light pipe or ii) one or more lens arrays. The projector also includes a spatially adjustable mask arranged at the homogenizer output face and adapted to spatially modulate light exiting the output face of the light homogenizer. The projector also includes an imaging lens arranged to receive the spatially modulated light and create a light beam therefrom that forms an image of the spatially adjustable mask on the object at a selectable distance from the imaging lens.

A third aspect of the invention is a method of forming a light beam to uniformly illuminate an object. The method includes housing a light source, a light homogenizer having and an imaging lens with a work light housing, wherein the light homogenizer includes a light tunnel or one or more lens arrays. The method also includes attaching the work light housing to a mount adapted to support the work light housing so as to assist in selectively directing the light beam to the object. The method further includes generating light from the light source and homogenizing the light by passing the light through the light homogenizer. The method also includes receiving with the imaging lens the homogenized light from an output face of the light homogenizer, and adjusting the imaging lens to focus the received light as the light beam to form a uniform beam spot at the object.

BRIEF DESCRIPTION OF THE DRAWINGS

FIG. 5A is a close-up side partial exploded view of an example embodiment of the light pipe of the present invention wherein the input face includes an array of cavities sized to accommodate the LEDs in the LED array;

FIG. 5B is a close-up side view similar to FIG. 5A, but showing the LEDs arranged in the respective cavities and thus embedded in the input face of the light pipe;

DETAILED DESCRIPTION OF THE INVENTION

For the purposes of explanation, specific embodiments are set forth to provide a thorough understanding of the present invention. However, it will be understood by one skilled in the art, from reading the disclosure, that the invention may be practiced without these details. Moreover, well-known elements, process steps, and the like, and including, but not limited to, optical components, electronic circuitry components and connections, are not set forth in detail in order to avoid obscuring the disclosed system.

Figure 1:
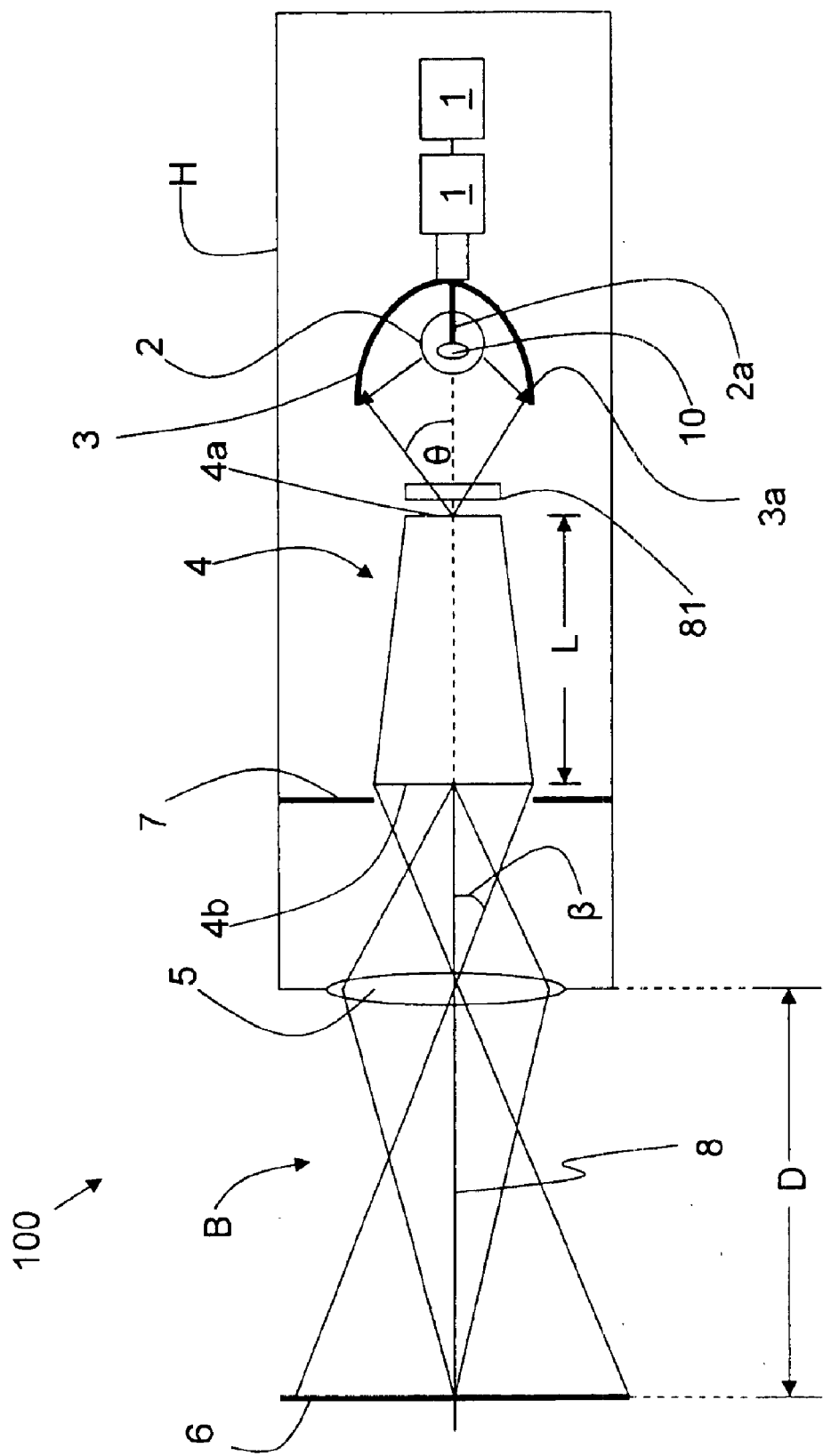
FIG. 1 is schematic cross-sectional diagram illustrating an embodiment of the flashlight of the present invention, wherein the flashlight has a light pipe, and showing the path of the light from the light source to the final image.

The preferred example embodiment of the flashlight invention 100 is shown in FIG. 1. Flashlight 100 includes a housing H which serves to enclose and/or support and protect (i.e., "house") the various elements making up the flashlight as described below. Two ordinary flashlight batteries 1 are shown in flashlight 100 of FIG. 1, but any number of batteries (i.e., one or more), or types of batteries, or any applicable power source will work as a power source for a conventional or ordinary flashlight bulb 2. The bulb 2 is located nominally at one focus 10 of an elliptical reflector 3 as shown. Instead of reflecting the light out directly from an elliptical reflector to the object or wall 6 as with prior art flashlights (not shown), where all the light from elliptical reflector is directed along a path substantially parallel to the optic axis, this embodiment of a flashlight 100 uses the same bulb filament 2a, but, reimages the light via an elliptical reflector 3 into the input aperture or input face 4a of a tapered light pipe 4.

To achieve this redirection into input face 4a, the light reflecting off reflector 3, is reflected at various angles to optic axis 8, depending on the particular location doing the reflecting on the elliptical reflector 3, such that all of the reflected light enters light pipe 4 at input face 4a, and where the outer cone angle θ is defined by the light reflecting from the outer edge 3a into input face 4a. After entering light pipe 4, the light reflects off the walls of light pipe 4 until such reflected light exits light pipe 4 through output aperture or output face 4b. The output from the light pipe is now reimaged by an imaging lens 5 to form a flashlight beam B, which is directed (i.e., focused) by the imaging lens onto the object plane or surface 6 at some distance D in front of the flashlight. If the lens 5 is of reasonable quality, the image of the output of the light pipe 4 will be a sharp and well-defined image of the edge of the light pipe 4. By adjusting the focus of the lens 5, or in other words its location along the optical axis 8, the image of the output of the light pipe 4 can be changed to any desired distance.

One well-known property of a light pipe 4 is that the light exiting the pipe at output face 4b, where the light pipe 4 is sufficient in length L, will be extremely uniform in brightness. This uniform brightness is due to the mixing or homogenization within the light pipe which is a result of multiple reflections within the length of the pipe. Another property of the light pipe 4, being tapered from a small square at the input face 4a to a larger square at the output face 4b, is that the cone angle θ of light incident will be transformed at the output face 4b so that the included angle of the cone decreases from an angle θ to an angle β as the output face 4b gets larger than the input face 4a (as shown), or conversely. During this transformation, the etendue is preserved. Here, the high numerical aperture of the light cone (meaning a large cone angle θ) of light incident to input face 4a is reduced in its cone angle to an angle β at the output face 4b in concert with an increase in the area at the output face 4b of the pipe 4. This transformation follows the relationship that the light pipe area times the solid angle of the light cone is constant, whether it is on the entrance side or the exit side. For a non-tapered light pipe (not shown), the numerical aperture entering the light pipe is maintained at the exit face of the pipe so that light entering at a given angle will exit the light pipe at the same angle.

Masks 7 of differing shapes and sizes can be located at the output face or surface 4b of the light pipe 4 so as to define, as desired, the shape of the pattern of light at the object 6. Thus a mask 7 could have the shape of a circle, an ellipse, a star, or any other desired shape. As such, the pattern of light can be modified, i.e., made larger, smaller, or have its shape changed, without effecting its uniform properties. Furthermore, any other light modifying component or surface can be located at the output face 4b of the pipe 4 such as an image or picture on a piece of film or transparency, for example, and this would be projected onto the object 6.

The uniqueness of this invention is the ability to take an old technology light source such as an extremely low cost flashlight bulb 2, in combination with a simple reflector 3, and create an extremely uniform and bright pattern or disc of light instead of the prior art type of flashlight which provides a very non-uniform and non-descript patch of light at the object 6. In other words, this invention provides a higher level of light or photon efficiency using existing technology flashlight bulbs 2. This has been one of the common problems of flashlights for many, many years, and through this invention we have finally solved this problem.

In other example embodiments, the reflector used to image the bulb filament 2a onto the light pipe 4 is a shape other than elliptical. Also the reflector can include facets or other surface treatments.

In the present invention, the light pipe need not be tapered, and in certain embodiments the input and output faces may be of the same size and area. Further, the light pipe may take on other shapes other than the square design of the preferred embodiment, such as circular, triangular, rectangular and the like.

In another embodiment of the invention, the image of the bulb filament is defocused from the entrance face of the light pipe. In addition a diffuser 81, which may be a holographic form of diffuser, is located at the entrance face of the light pipe. The combination of the defocused image of the filament and the diffuser at the entrance face of the light pipe produces a larger bright area or patch of light than with a focused filament image and no diffuser. The net result is that the uniformity is improved at the output face of the light pipe because the "kaleidoscoped" light patterns are more filled in than with a focused filament image.

Further, it is possible to take the output of the light pipe and locate or position a circular rod of glass to act as a solid circular light pipe whose output then would now be imaged to the object.

Another embodiment of the current invention would use a so-called "CPC" or "Compound Parabolic Concentrator" whose input aperture or face would be located at the focus of the ellipse. The output of the CPC would be a circular disc of light whose cone angles are well defined, and could be very easily imaged on to the object. In this embodiment we are simply replacing the tapered light pipe with a CPC.

The light source does not necessarily have to be a filament lamp 2. For example, it could alternatively be a form of light emitting diode or LED, or potentially a laser source which would need to be transformed into a cone of light or otherwise imaged into the input of the light pipe. The source could also be an arc lamp such as a xenon lamp, or any other source of light.

Figure 2:
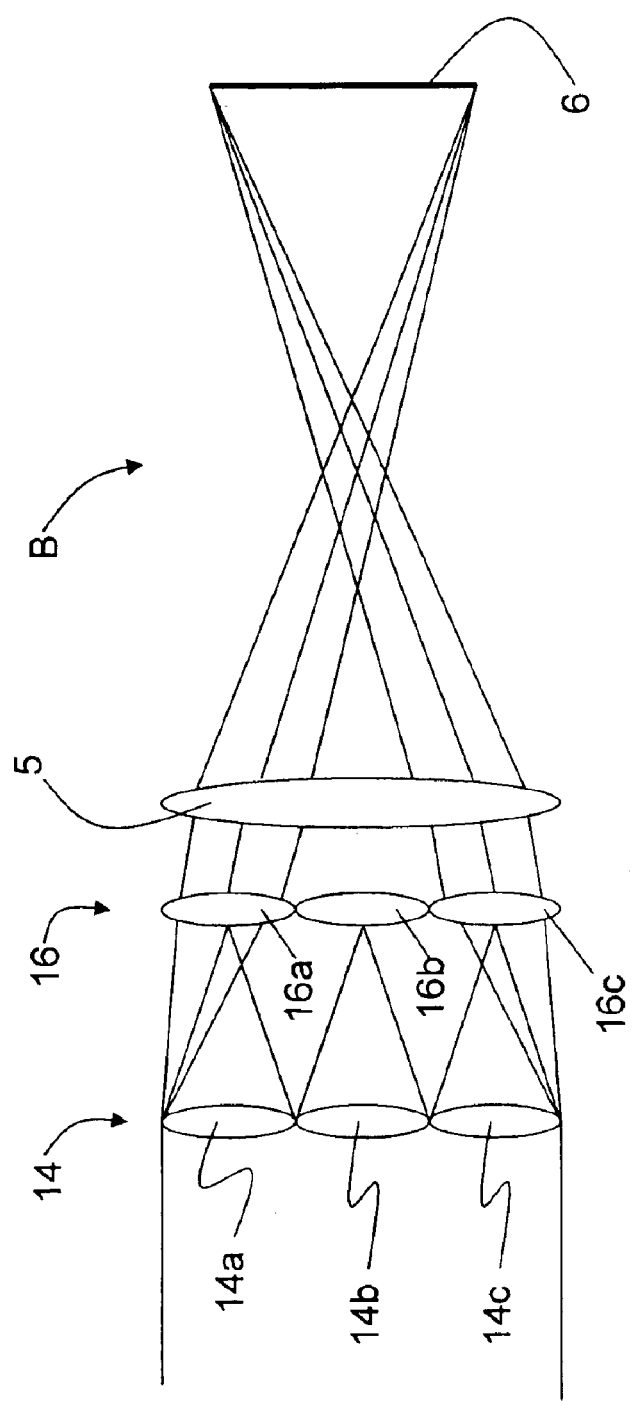
FIG. 2 is close-up schematic diagram showing a side view of an embodiment of the flashlight of the present invention, wherein the flashlight includes two sets of lens arrays, and showing the path of the light as it travels through the lens arrays to the final image.

Furthermore, as shown in FIG. 2, a uniform pattern of light may also be achieved, i.e., homogenization, by using lens arrays to convert non-uniform light distributions into more uniform light patterns or images. This technique may be used in conjunction with typical non-uniform flashlight output to produce a uniform image. It is also contemplated that existing flashlights could be retrofitted with appropriately designed lens arrays to achieve a more uniform light pattern. Lens arrays 14 and 16, unlike standard lens 5, contain more than one lens, or lenslet 14a–14c, in a single optical medium 14. However, the lenslets need not exist in the same optical medium 14, but need only be located along the path of light extending from the light source. Lens arrays are typically described by the number of lenslets they contain. For example, a 4×4 array is a single optical medium having 16 lenslets arranged 4 high and 4 wide. It is contemplated that lens arrays can be employed in any of the following designs: a single set of lens arrays 14, a pair of lens arrays 14 and 16, or any number of lens arrays. Where such multiple sets of arrays are used, for example a pair of arrays 14 and 16, the first lens array 14 would be used to sample, or receive, the non-uniform output from a light source.

Each lenslet 14a–14c of the first array focuses a portion of the beam into the aperture of a second array of lenslets 16a–16c. The elements of the second array image the aperture of the elements of the first array into a uniform pattern of light on a distant plane 6, or where more than two sets of arrays are used 14 and 16, the last set of lens arrays 16 performs the final imaging before standard imaging lens 5 focuses the reimaged light on object 6. Regardless of the number of arrays used, the resulting image at the particular plane or object 6 is the product of the superposition of multiple images. By using lens arrays 14 and 16 it is possible to zoom the size of the distant plane 6 by moving the lens arrays 14 and 16 relative to one another. It is contemplated that such relative movement of multiple lens arrays allows the size of the image to be increased by up to at least a factor of three.

LED Array Embodiments

Figure 3:
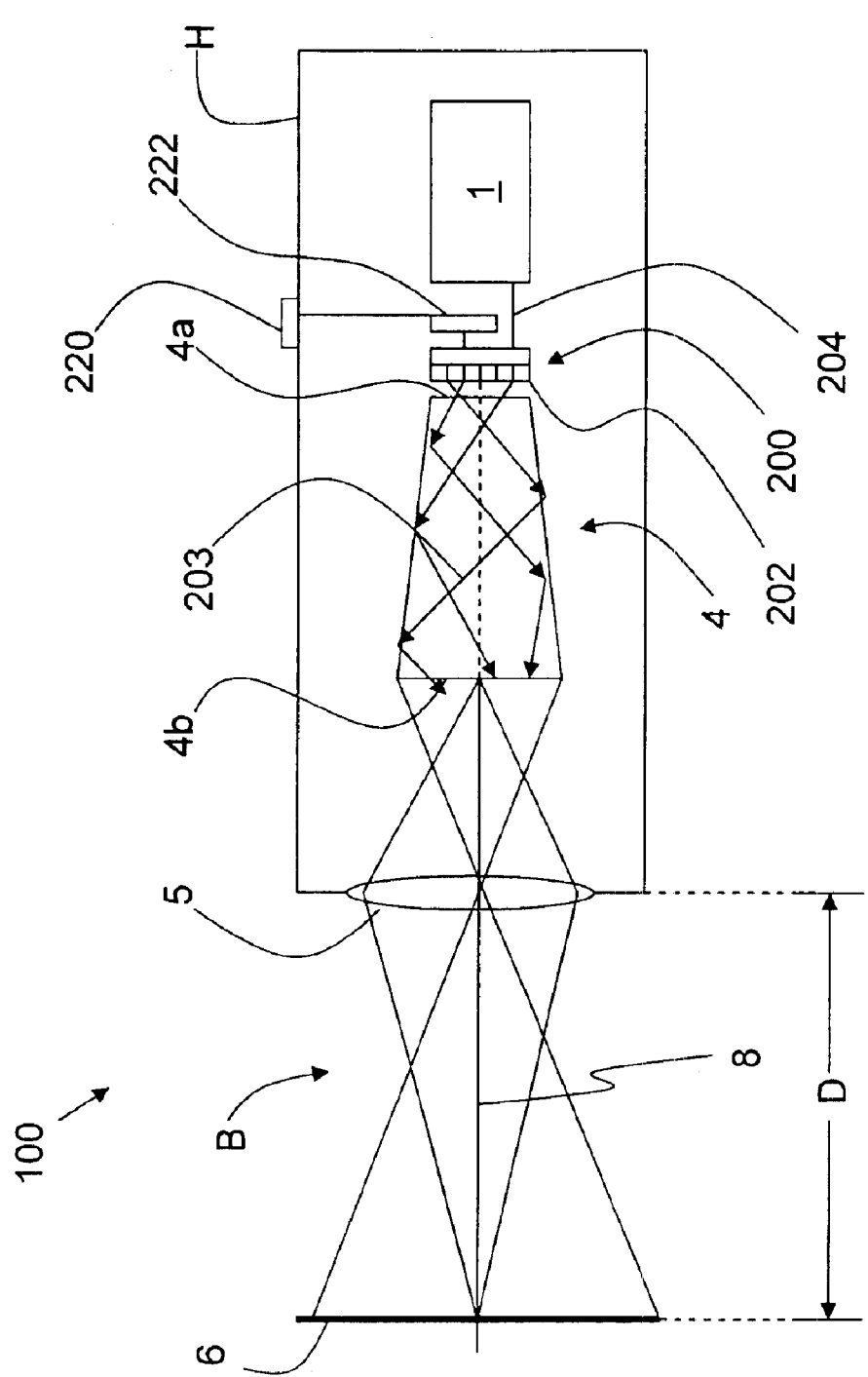
FIG. 3 is schematic cross-sectional diagram similar to FIG. 1, but illustrating an example embodiment wherein the flashlight has an array of LEDs as its light source.
Figure 4:
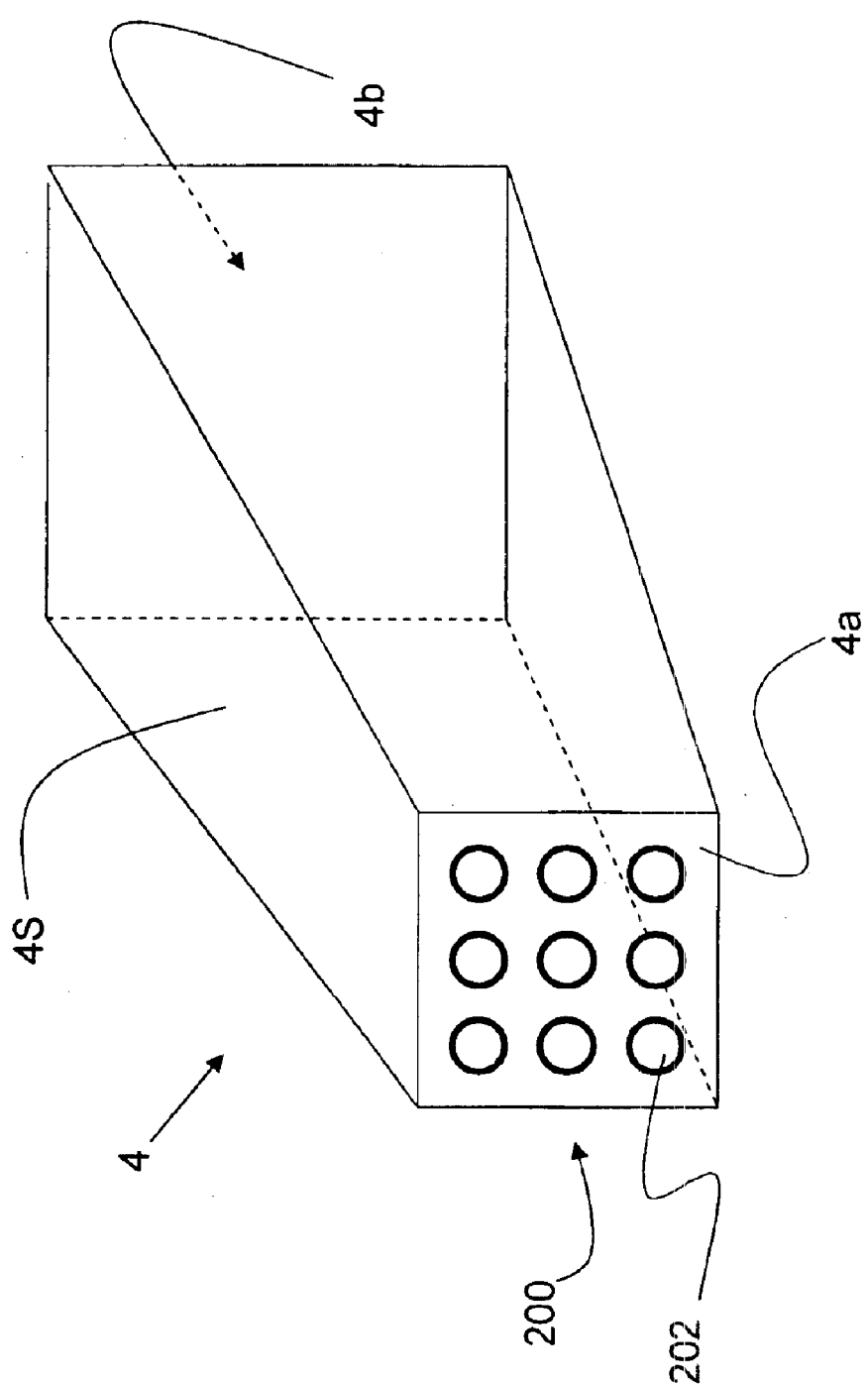
FIG. 4 is a close-up, perspective, input-face-on view of the light pipe of the embodiment of FIG. 3, illustrating an example arrangement of the LEDs at the light pipe input face.

FIG. 3 is a schematic cross-sectional diagram of an example embodiment of flashlight 100 similar to that of FIG. 1, but having an LED array 200 arranged adjacent light pipe input face 4a. FIG. 4 is a close-up perspective view of the LED array and light pipe 4. LED array includes one or more LEDs 202, each of which emits light 203. In an example embodiment, LED array 200 is a square array of 2×2, 4×4, etc. LEDs In another example embodiment, LED array 200 consists of a single LED 202. In another example embodiment, the LED array 200 includes a plurality of LEDs having a rectangular or other polygonal arrangement. Suitable LEDs for the present invention can be obtained from a number of suppliers, such as Advanced Photonics, Inc., of Camarillo, Calif., or Lumileds Lighting, LLC, of San Jose, Calif.

LED array 200 is operably coupled to batteries 1 via an electrical connection 204. Batteries 1 provide the energy necessary to activate (turn on) and power the LEDs and generally represent any type of suitable power supply. The LEDs are arranged relative to light pipe input face 4a so that light 203 emitted from the LEDs is coupled into light pipe 4. In an example embodiment, LED array is optically cemented or otherwise bonded directly to input face 4a.

In an example embodiment, LEDs 202 are die-level rather than packaged (i.e., encapsulated in a plastic housing having a plastic lens). Packaged LEDs can be used in the present invention, but the optical coupling between the light pipe and a packaged LED tends to be less efficient than that for die-level LEDs.

The larger the number of LEDs 202 in array 200, the greater the brightness and uniformity of image 6. Because all or all but one of the LEDs 202 are off-axis relative to axis 8 (depending on the LED array geometry), light 203 from the LEDs undergoes a kaleidoscopic effect wherein the light from each LED is rotated and superimposed at light pipe output face 4b. This rotation and overlapping further increases the uniformity of image 6 when the light pipe output face is imaged by imaging lens 5.

Colored LEDs Embodiments

With continuing reference to FIGS. 3 and 4, in an example embodiment, LEDs 202 in LED array 200 are different "colors," i.e., they output different wavelengths of light. In a more specific example embodiment, the LED colors are red, green and blue. By way of example, LED array can be a 3×3 array having 3 blue LEDs, 2 green LEDs and 4 red LEDs. By using or activating the appropriate number of red, green and/or blue LEDs, flashlight 100 is capable of generating light beam B of virtually any color.

To this end, in an example embodiment, flashlight 100 includes a switch 220 accessible to a user (not shown) of the flashlight. For example, the switch can be located on the flashlight housing H, as shown. Switch 220 is operably coupled to the LED array, which is adapted to receive input signals from the switch and selectively activate some or all of the LEDs to create a light beam of a chosen color and brightness. In an example embodiment, switch 220 is electrically coupled to an electronic switching circuit 222, which in turn is electronically coupled to LED array 200. The selective activation of LEDs 202 via switch 220 (i.e., changing the state of the LED array by switching on or off one or more of the LEDs) to create a desired light beam B (or no light beam at all) obviates the need for attaching filters to the flashlight to obtain a light beam B of a particular color.

By way of example, for a flashlight user who needs to read a document (e.g., a map) at night, the user can select via switch 220 the setting that activates the red LEDs, or even a subset of the red LEDs, while adjusting imaging lens 5 so that image 6 is formed at a distance D corresponding to the location of the document to be read, such as a map. This allows the user to read the document while also maintaining his or her night vision to perform other tasks. The user also has the choice to then activate some or all of the LEDs to create a white light beam (if such a beam is desired), and to re-adjust imaging lens 5 to form image 6 a different distance D—say, to read a house number of a house (not shown) located tens of feet away from the user.

Further, in another example embodiment of the use of flashlight 100, the user can operate switch 220 to turn off all of LEDs 202 with the exception of one off-axis LED, e.g., an LED at the corner of array 200. This single LED, which is also at a corner of the input face 4a of light pipe 4, will still produce uniform light at light pipe output end 4b because of the above-mentioned kaleidoscopic effect.

In an example embodiment of the present invention, any distribution of activated/inactivated (on/off) LEDs produces a very uniform, bright light patch (distribution) at light pipe output face 4b, as well as very uniform, bright image 6 at distance D. The degree of uniformity in image 6 depends on the number of "bounces" of the light from the LEDs take within the light pipe, as well as on the number of LEDs 202 in array 200. Also, the degree of brightness in image 6 formed by flashlight 100 also depends directly on the number of LEDs present (or, more particularly, the number of LEDs activated) in array 200.

In an example embodiment, switching circuit 222 is adapted to cause one or more LEDs 202 to flash when the proper signal is initiated by a user via switch 220. For example, LED array 200 can be made to cause certain (e.g., red) LEDs 202 to flash on and off for emergencies.

Thus, in the present embodiment of flashlight 100, it is apparent that a number of different types of light beams B (e.g., different colors, brightnesses, flashing patterns, etc.) can be formed, wherein each such light beam B in turn forms a uniform, bright image 6 at a distance D selected by adjusting imaging lens 5.

Embedded LED Embodiments

It is preferred that light 203 generated by LED array 200 be efficiently coupled into light pipe 4. LED dies are known to emit light efficiently over 2π Steradians. Thus, it is advantageous to arrange the LEDs as close as possible to light pipe input face 4a so that as much light as possible is collected.

FIGS. 5A and 5B are close-up side views of an example embodiment of light pipe 4, wherein the input face 4a includes an array 240 of cavities 242, wherein each cavity is sized to fit an LED 202. In FIG. 5A, the LEDs are shown adjacent the cavities for ease of illustration. In FIG. 5B, the LEDs are shown in the cavities, i.e., embedded in the light pipe at input face 4a. In a preferred embodiment, LEDs 202 are dies, though packaged LEDs can be used in this embodiment, albeit less effectively.

As illustrated in FIG. 5B, because at least a portion of each LED resides within (i.e., is at least partially embedded in) the light pipe, more of the light emitted by each LED is captured by the light pipe and relayed to output face 4b than when the LED is external to the light pipe. This, in turn, results in brighter and more uniform distribution of light at output face 4b, and in turn, at image 6.

Figure 6:
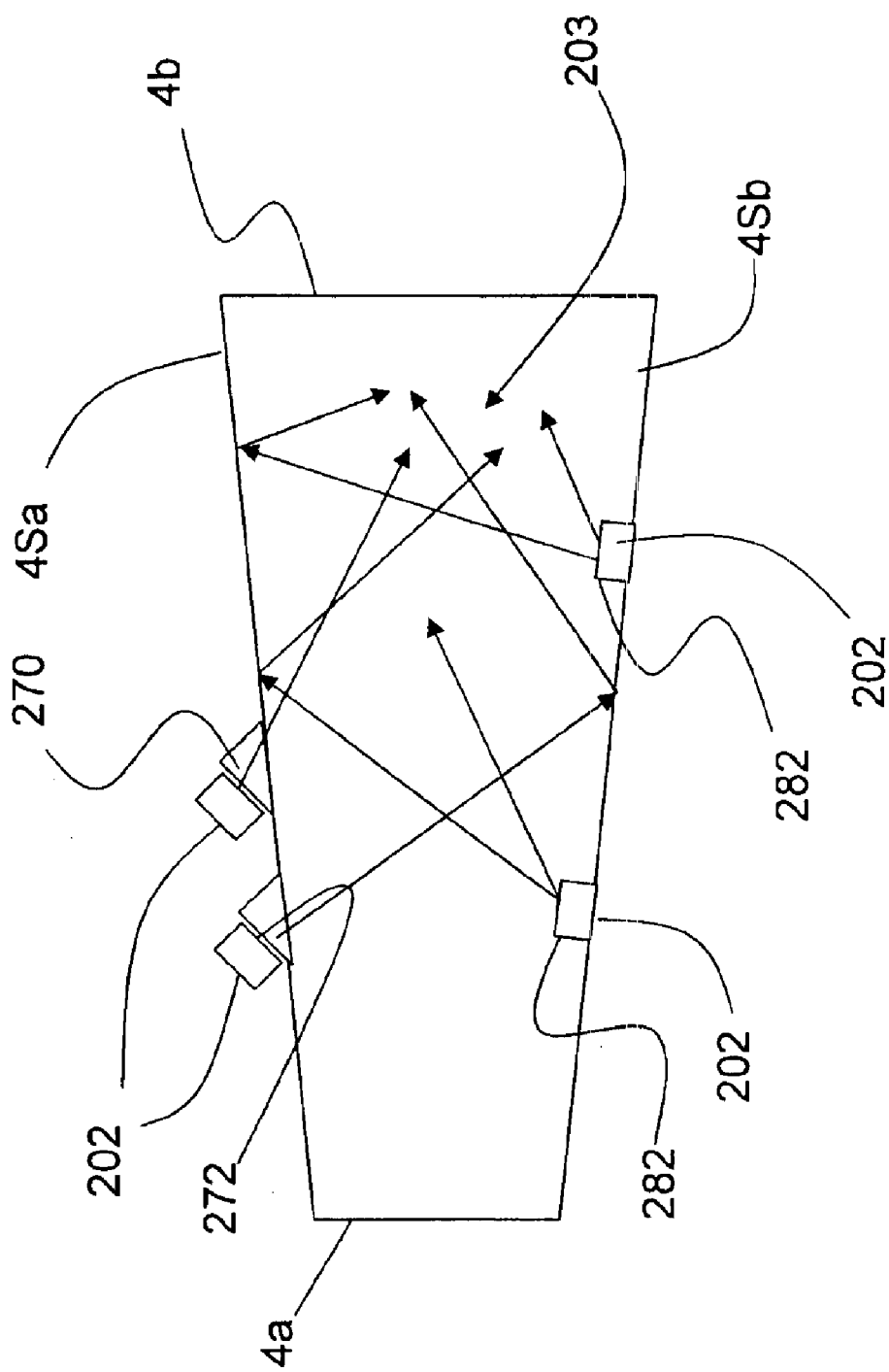
FIG. 6 is a close-up cross-sectional view of an example embodiment of a light pipe of the present invention, wherein the light pipe includes prisms formed on one side of the light pipe, and cavities formed on another side, and wherein the prisms are adapted to interface with LEDs, and wherein the cavities and prisms are adapted to facilitate coupling light from the LEDs into the light pipe.

FIG. 6 is a cross-sectional view of another example of an embodiment of light pipe 4. In this particular example embodiment, two of light pipe sides 4S are identified as 4Sa and 4Sb for the sake of illustration. In one example, side 4Sa includes prism-like protrusions ("prisms") 270 attached to or formed integral with the light pipe side. Prisms 270 have a face 272 to which an LED 202 is coupled (e.g., bonded or optically cemented). This allows for light to be injected into light pipe 4 from the side 4Sa rather than from or in addition to inputting light at input face 4a.

FIG. 6 also illustrates an example embodiment wherein light pipe 4 includes cavities 282 formed in side 4Sb, wherein the cavities are sized to accommodate respective LEDs 202 so that the LEDs are embedded in the light pipe. In this manner, light 203 from the LEDs is coupled into light pipe 4 from side 4Sb rather than or in addition to inputting light at input face 4a and/or side 260a.

As discussed above in connection with FIG. 3, in an example embodiment the LEDs 202 of FIG. 6 are also electrically connected to electronic switching circuit 222, which in turn is connected to switch 220 so that the LEDs can be selectively activated and deactivated. Likewise, the LEDs 202 in FIG. 6 can be all of the same color or have different colors.

Light Pipe Assembly Embodiments

In an example embodiment of the present invention, two or more light pipes are coupled to one another or multiplexed to enhance optical uniformity and brightness. In an example embodiment, this is achieved by preserving the etendue by launching the maximum solid angle of light into reach respective light pipe.

Figure 7:
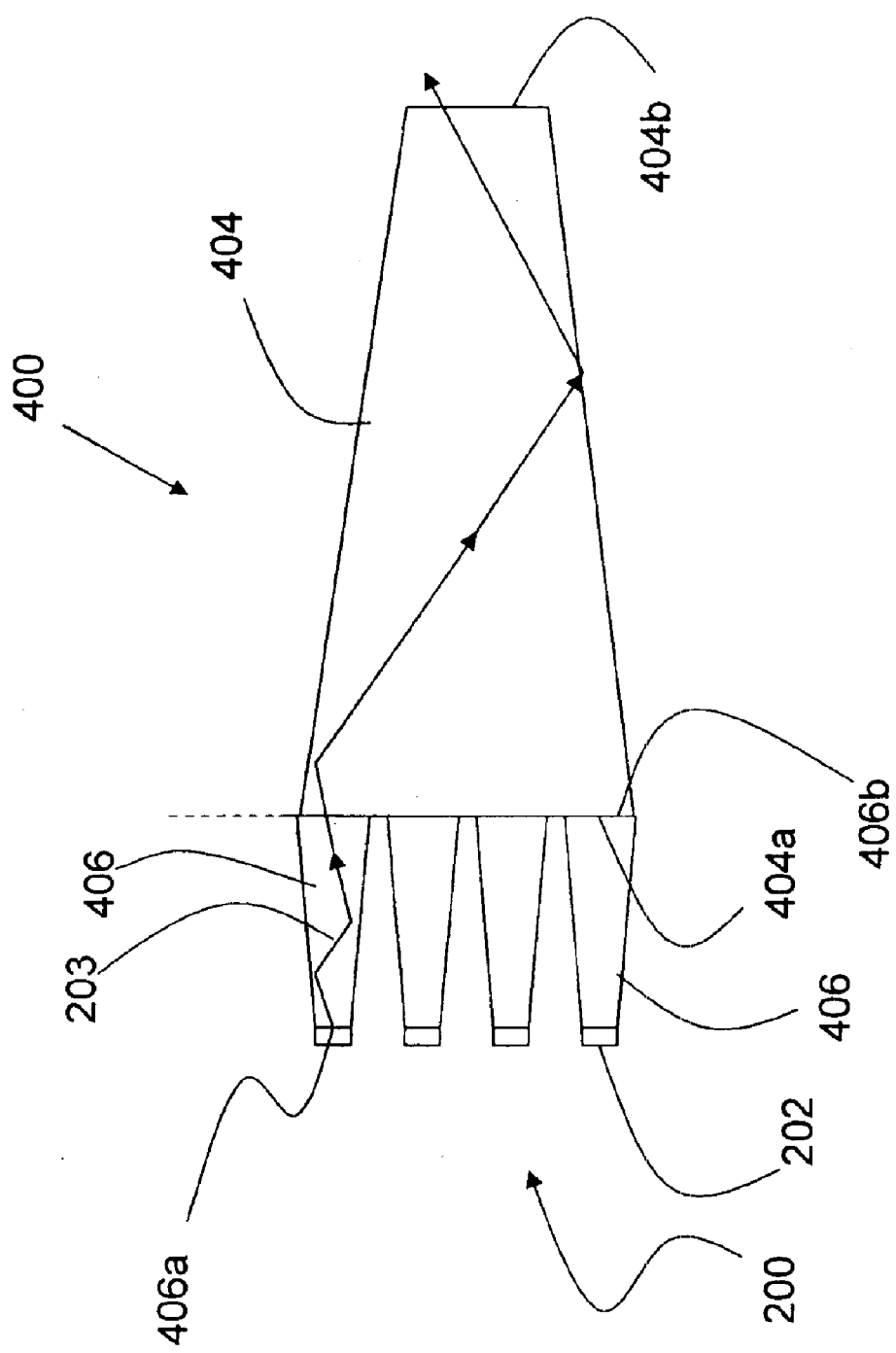
FIG. 7 is a side view of an example embodiment of a light pipe assembly that includes an array of secondary light pipes coupled to the input face of a main light pipe.

FIG. 7 is a side view of an example embodiment of a light pipe assembly 400 that allows for efficient coupling of light from the LEDs. Light pipe assembly 400 includes a main or "first" light pipe 404. Main light pipe 404 may have a variety of shapes (e.g., tapered or straight walls, rectangular, square or other polygonal or circular cross-section, etc.) and in an example embodiment is essentially the same as light pipe 4 (FIG. 3). Main light pipe 404 has an input end 404a and an output end 404b.

In the example embodiment of FIG. 7, light pipe assembly 400 includes an array of one or more secondary light pipes 406 each smaller than the first light pipe and having an input end 406a and an output end 406b. In FIG. 7, an array of four light pipes 406 is shown for the sake of illustration. The secondary light pipes 406 are coupled to or formed integral with the first light pipe 404 so that the output ends 406b of the secondary light pipes are interfaced with input end 404a of the first light pipe. In this sense, the secondary light pipes are multiplexed with the first (main) light pipe.

In an example embodiment, secondary light pipes 406 are tapered so that output ends 406b are larger than input ends 406a. Where the secondary light pipes are formed integrally with the first light pipe, the output ends 406b of the secondary light pipes and the input end 404a of the first light pipe are defined by a fictitious surface 409 (dashed line) representing where the light exits the secondary light pipes and enters the first light pipe.

With continuing reference to FIG. 7, each secondary light pipe 406 includes one or more LEDs coupled (e.g., bonded or optically cemented) to its input end 406a. Thus, input ends 406a collectively serves the same purpose and correspond to input face 4a of light pipe 4 (FIG. 3).

In operation, light 203 from each LED 202 is scrambled in each secondary light pipe 406 to form a relatively uniform light distribution at output faces 406b. This uniformized light then proceeds into main light pipe 404. Each of output ends 406b acts as a uniformized light source, which further uniformized by the kaleidoscopic effect of first light pipe 404. This results in a high level of uniformity at main light pipe output end 404b.

In light pipe assembly 400, in an example embodiment LEDs 202 are separated from each other, which is advantageous for packaging and managing the thermal output of the LEDs (as technology progress and the output power of LEDs increases, managing the thermal budget of LEDS in compact optical systems will become increasingly more difficult). Also, light pipe assembly 404 has the advantage that it is typically easier to align individual LEDs to an input end of a small light pipe 406 than to align an array of LEDs to an input face of a single, larger light pipe.

As discussed above in connection with FIG. 3, in an example embodiment the LEDs 202 of FIG. 7 are also electrically connected to electronic switching circuit 222, which in turn is connected to switch 220 so that the LEDs can be selectively activated and deactivated. Likewise, the LEDs 202 in FIG. 7 can be all of the same color or have one or more different colors.

Note that in the example embodiment of main light pipe 404 shown in FIG. 7 is tapered. However, in other example embodiments, main light pipe can be untapered.

Battery Arrangement

Figure 8:
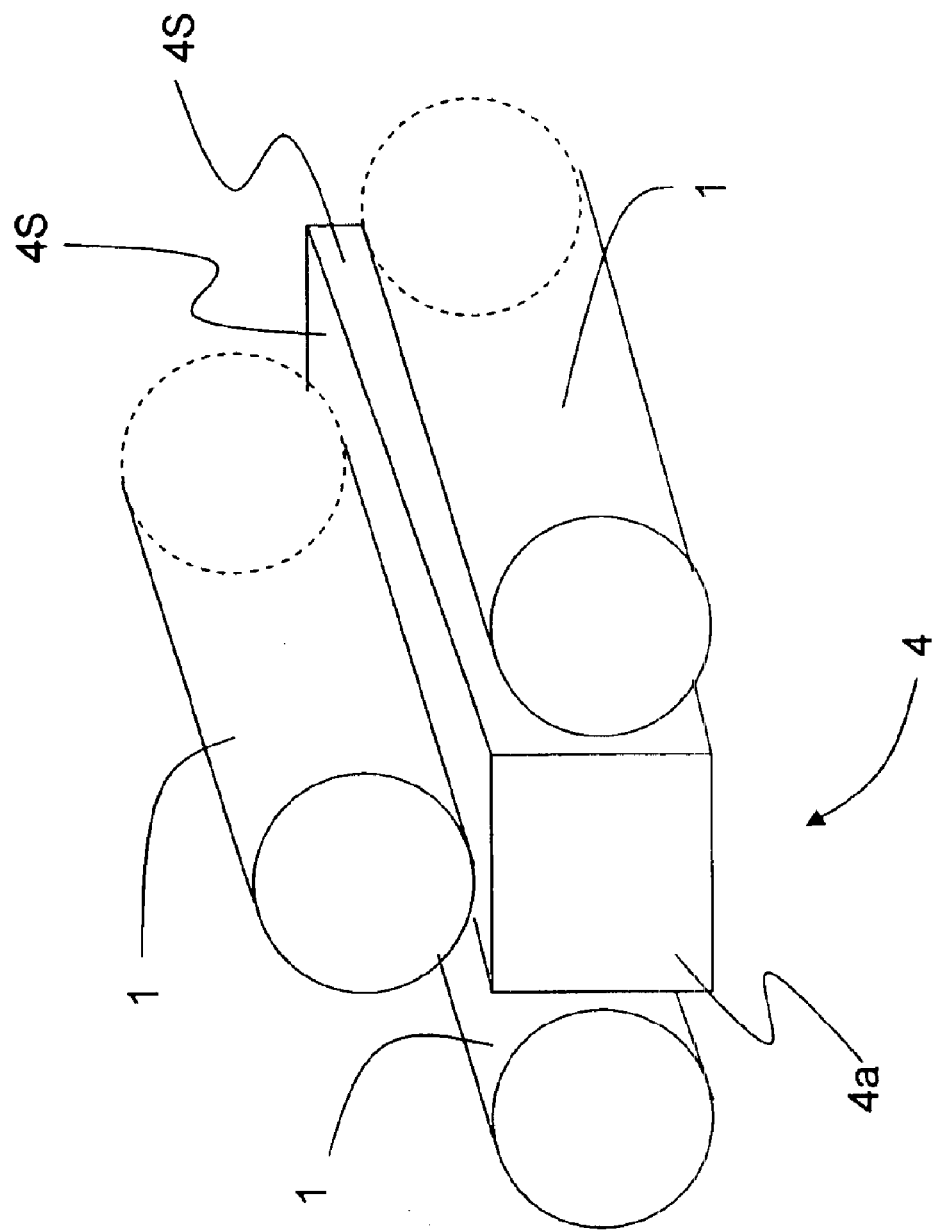
FIG. 8 is a perspective input-face-end view of the light pipe illustrating an example embodiment wherein the batteries are arranged to at least partially surround the sides of the light pipe.

FIG. 8 is perspective view of light pipe 4 showing an arrangement wherein three batteries 1 are arranged to partially surround sides 4S of the light pipe. This arrangement makes efficient use of the space within housing H, which in turn makes for a compact flashlight 100.

Work Light Example Embodiments

The present invention also includes a compact work light that provides bright, uniform illumination. The work light is adaptable for a variety of industrial, professional and personal applications, several examples of which are illustrated below.

Work Lamp

Figure 9:
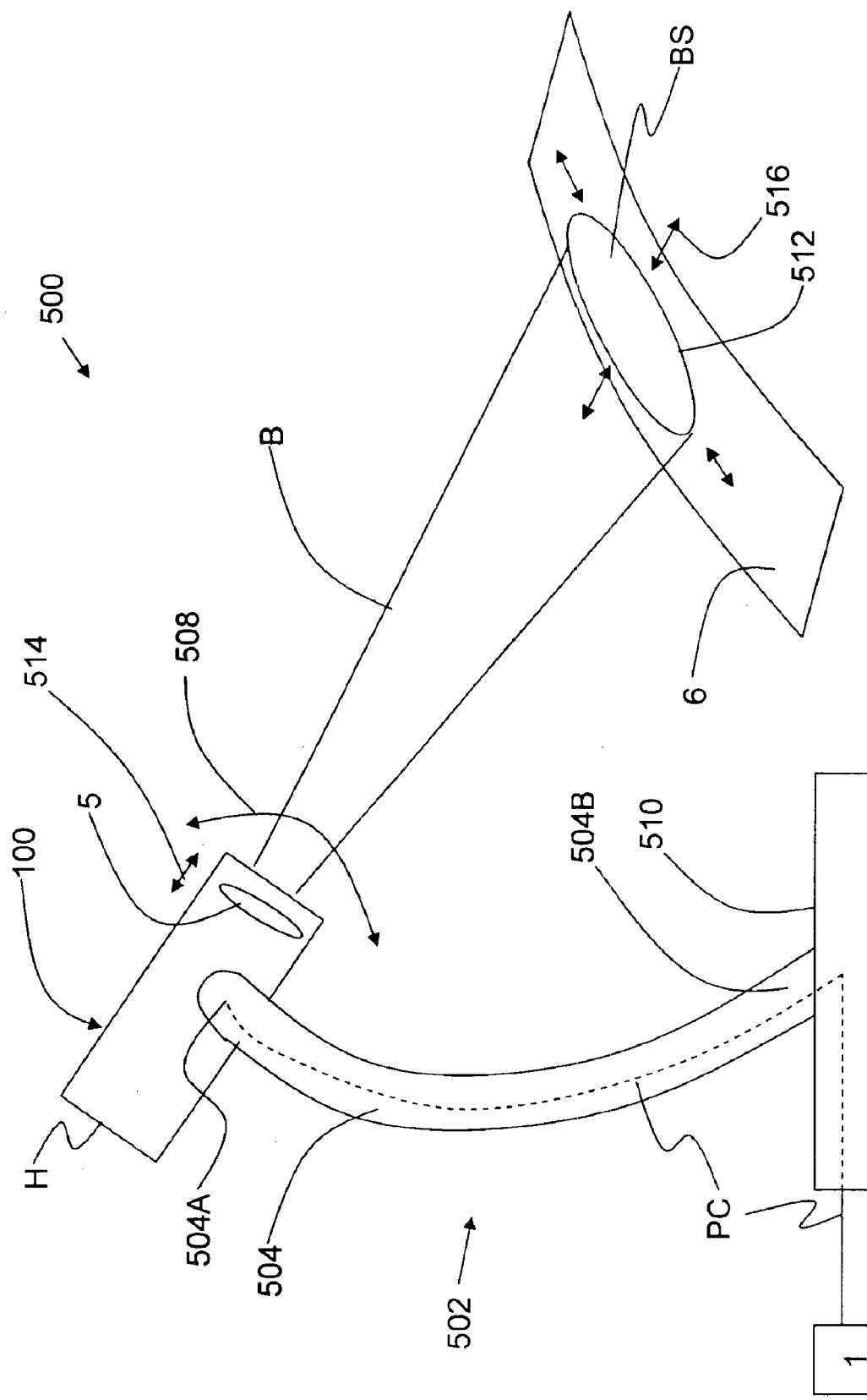
FIG. 9 is a side view of an example embodiment of a work light according to the present invention.

FIG. 9 is a schematic side view of an example embodiment of a work light according to the present invention in the form of a work light 500. Work light 500 includes flashlight 100 or a variation thereof, which is referred to hereinafter as just "light 100." Similarly, the beam generated by light 100 is referred to hereinafter as just "light beam B." Further, the image formed by light beam B at object 6 is also referred to as "beam spot BS."

In an example embodiment, light 100 is supported by a mount 502 attached to housing H. In an example embodiment, mount 502 is adjustable, and in an example embodiment includes an adjustable (e.g., a flexible) arm 504 having respective first and second ends 504A and 504B. First end 504A is movably connected to housing H so that the position of light 100 can be adjusted and set in a desired spatial orientation relative to an object 6 (e.g., workpiece), as illustrated by arrow 508. Thus, in an example embodiment, mount 502 is attached to the housing and is adapted to movably support the housing so as to direct the light beam B to an object 6 to be viewed.

Further, in an example embodiment, second end 504B of adjustable arm 504 is connected to a support member 510, such as a movable base (e.g., a weighted lamp base) as shown.

In an example embodiment, light 100 is connected to a remote power source 1 via a power cord PC (e.g., a wire) rather than having batteries or other type of power source residing directly within housing H (see FIG. 14, described in greater detail below). Thus, power cord PC operably connects power source 1 to light 100 in order to power the light source.

Work light 500 projects a beam B onto object 6, which forms an image on the object in the form of a beam spot BS having a boundary 512. As discussed above, in an example embodiment, beam spot boundary 512 has a shape defined by a mask 7 (FIG. 1). The boundary shape can be circular, square, etc. The size of beam spot BS is adjusted by adjusting (e.g., axially moving) imaging lens 5 (as indicated by arrow 514), and/or by moving light 100 relative to object 6 (e.g., via adjusting adjustable mount 502). The adjustment of the size of beam spot BS is illustrated by arrows 516. In a preferred example embodiment, beam spot boundary 512 is sharp so that the illumination is uniform over the beam spot right up to boundary and casts substantially no light outside of the boundary.

Figure 10:
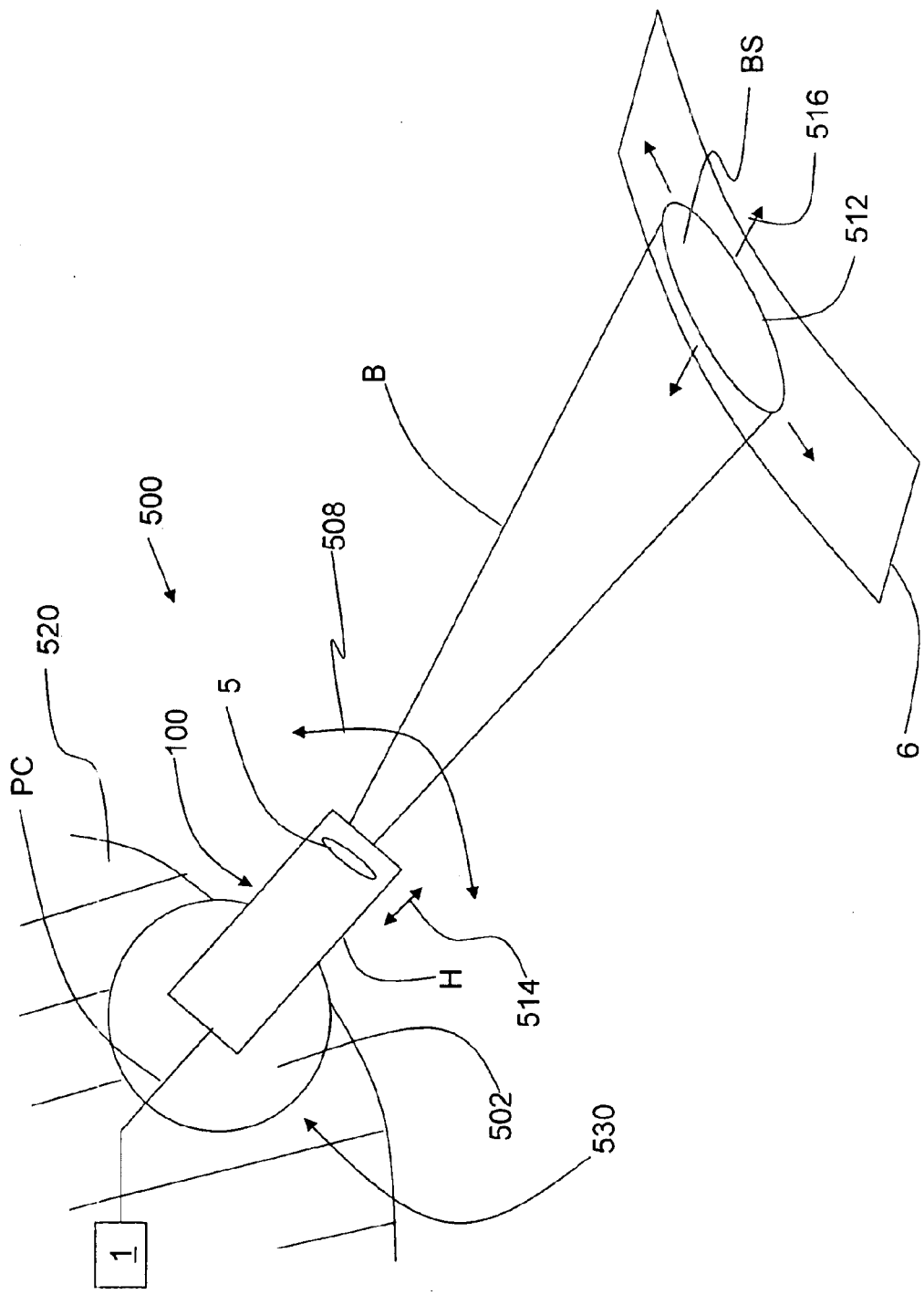
FIG. 10 is a schematic side view of an example embodiment of the work light of FIG. 9 as mounted in or to a fixed region.

FIG. 10 is a schematic side view of an example embodiment of a work light similar to that shown in FIG. 9, but that is mounted in or to a fixed region 520. Fixed region 520 may be, for example, an interior of a car roof, the interior roof of an airplane above a passenger seat, a wall, a floor, a ceiling, etc. In an example embodiment, light 100 is mounted to region 520 using an adjustable mount 502. In an example embodiment, adjustable mount 502 is an a ball-type mount residing with a corresponding ball-type cavity 530 formed in fixed region 520, as shown in FIG. 10.

Dentist Light

Figure 11:
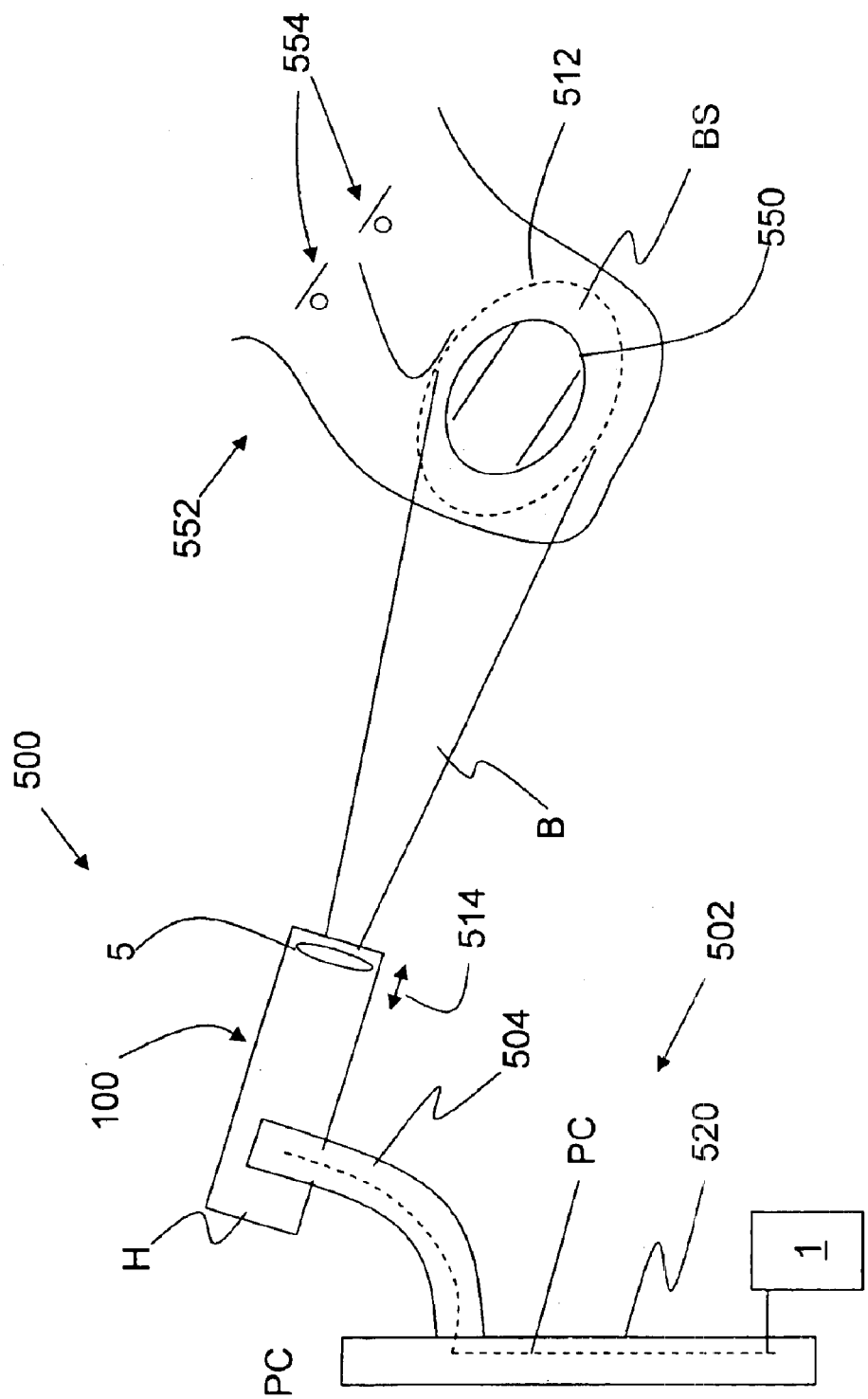
FIG. 11 is a schematic diagram of an example embodiment of the work light of FIG. 9 as used as a dentist light.

FIG. 11 is a schematic diagram of an example embodiment of the work light 500 of FIG. 9 as used as a dentist light. In an example embodiment, adjustable arm 504 is mounted to fixed region 520, such as a wall or a dentist chair. Also in an example embodiment, light 100 is coupled to power source 1 (e.g., an electrical outlet) via power cord PC.

Beam spot BS is adjustable to illuminate the mouth 550 of a person 552, who can be considered as the object (workpiece) 6 for this embodiment. In an example embodiment, the size of beam spot BS is adjusted to be large enough to illuminate mouth 550 and preferably has a sharp boundary 512 that prevents light from reaching the eyes 554 of the person.

This dentist light embodiment of work light 500 is advantageous because it provides a much higher degree of illumination uniformity, which allows the details of the relevant portion of the workpiece portion—in this case, the person's teeth—to be seen more distinctly. This embodiment is also advantageous because the sharp illumination boundary avoids stray light. Further, this embodiment is advantageous because it is much more compact, wieldy and efficient than conventional dental lamps.

Headlight

Figure 12:
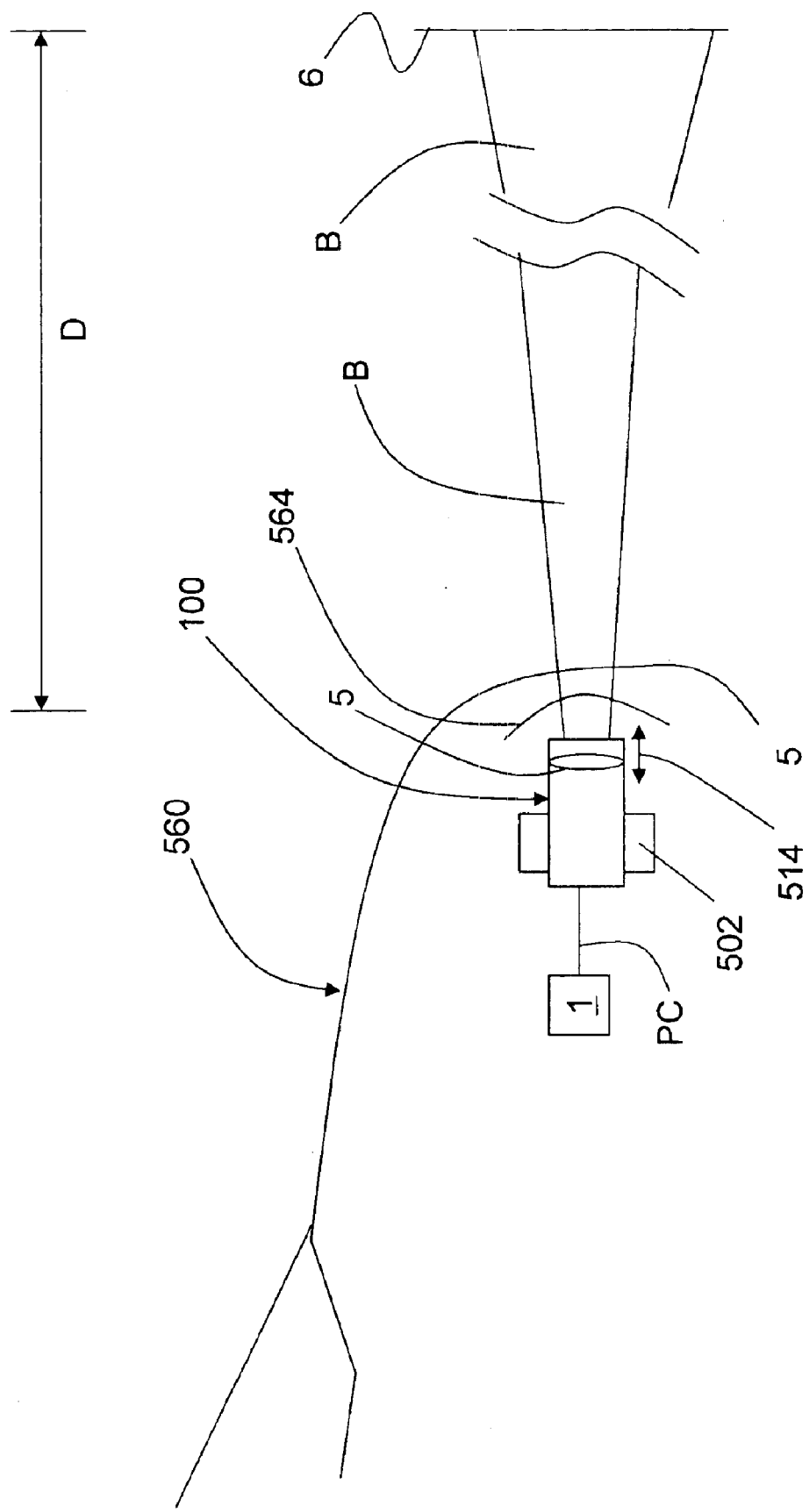
FIG. 12 is a schematic diagram of an example embodiment of the work light of FIG. 9 as used as a headlight, e.g., for an automobile.

FIG. 12 is a schematic diagram of an example embodiment of the work light of FIG. 9 as used as a headlight 500. In the illustration of FIG. 12, the headlight is described in connection with an automobile 560. However, the headlight 500 is generally applicable to any vehicle that might utilize a headlight, such as a bicycle, a motorcycle, a boat, a fork lift, etc. The discussion below is general to all such applications.

Continuing with the example embodiment of FIG. 12, headlight 500 is mounted via mount 502 at a front-end 562 of automobile 560. In an example embodiment, power cord PC is connected to power source 1, such as a car battery.

In an example embodiment, a protective covering 564 is placed over headlight 500. In an example embodiment, light beam B is set or otherwise adjusted via imaging lens 5 to form a beam spot BS at a distance D from light 100. In an example embodiment, distance D is set at a visually favorable distance for illuminating objects.

In another example embodiment, imaging lens 5 is electronically adjustable (arrow 514) so that the distance D is selectable e.g., by an operator (not shown) of automobile 560. This type of adjustability allows for an optimum distance D to be selected to suit a variety of different operating conditions, e.g., night driving conditions, fog, rain, snow, populated areas, unpopulated areas, etc.

Head Lamp

Figure 13:
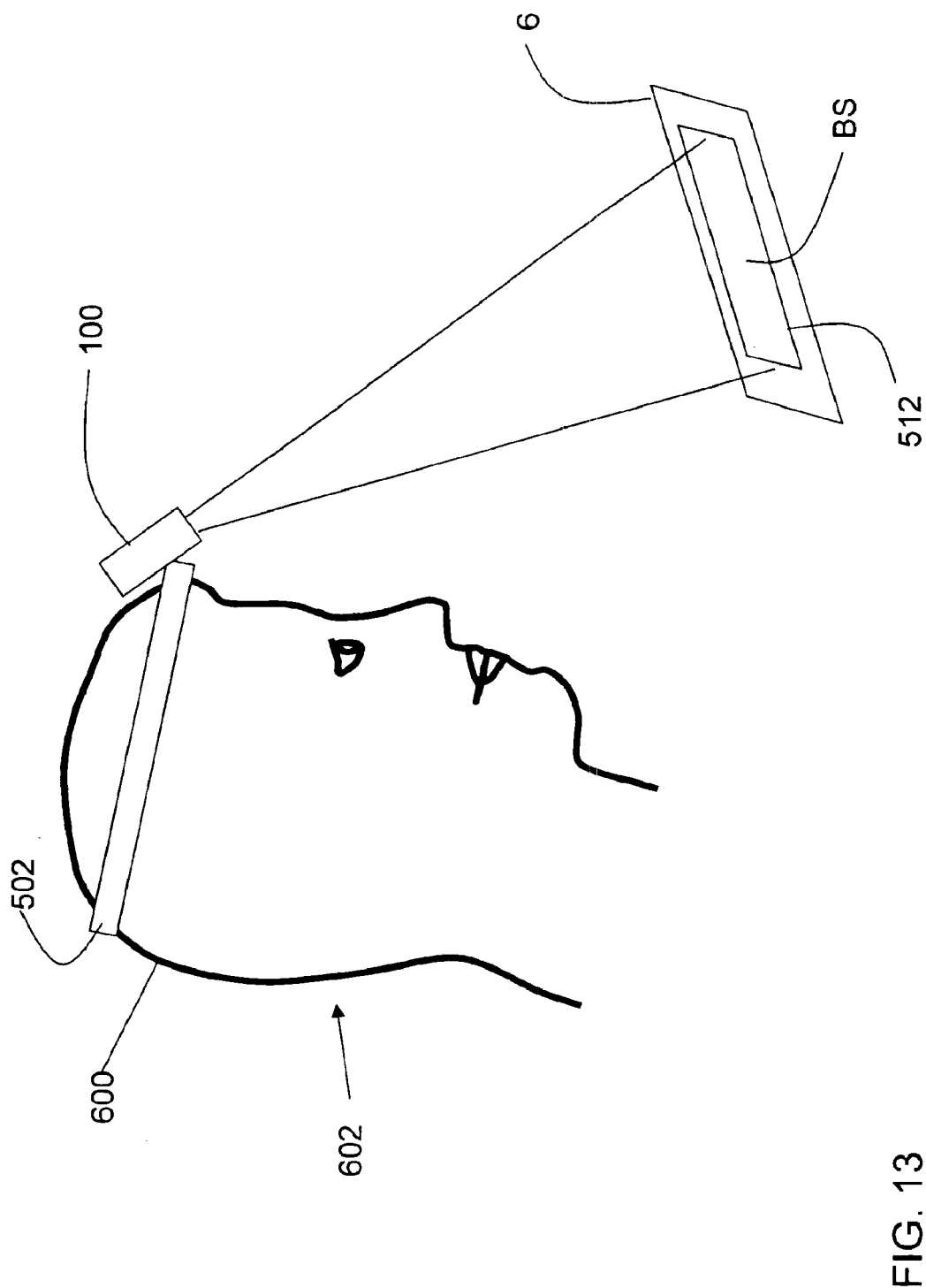
FIG. 13 is a schematic diagram of an example embodiment of the work light of FIG. 9 as used as a head lamp.

FIG. 13 is a schematic diagram of an example embodiment of a work light similar to that of FIG. 9, and arranged for use as a head lamp 500. Mount 502 is a removable head mount, such as an adjustable headband, that fits over the head 600 of a user 602. Light 100 is movable so that the position of light beam B can be adjusted by user 602. Also, the position and size of beam spot BS at object 6 (e.g., a map) is adjustable via adjustment of imaging lens 5 (see FIG. 9). In this head lamp embodiment, the power source is preferably one or more batteries, such as described above in connection with FIGS. 1, 3 and 8.

Optical Projector

Figure 14:
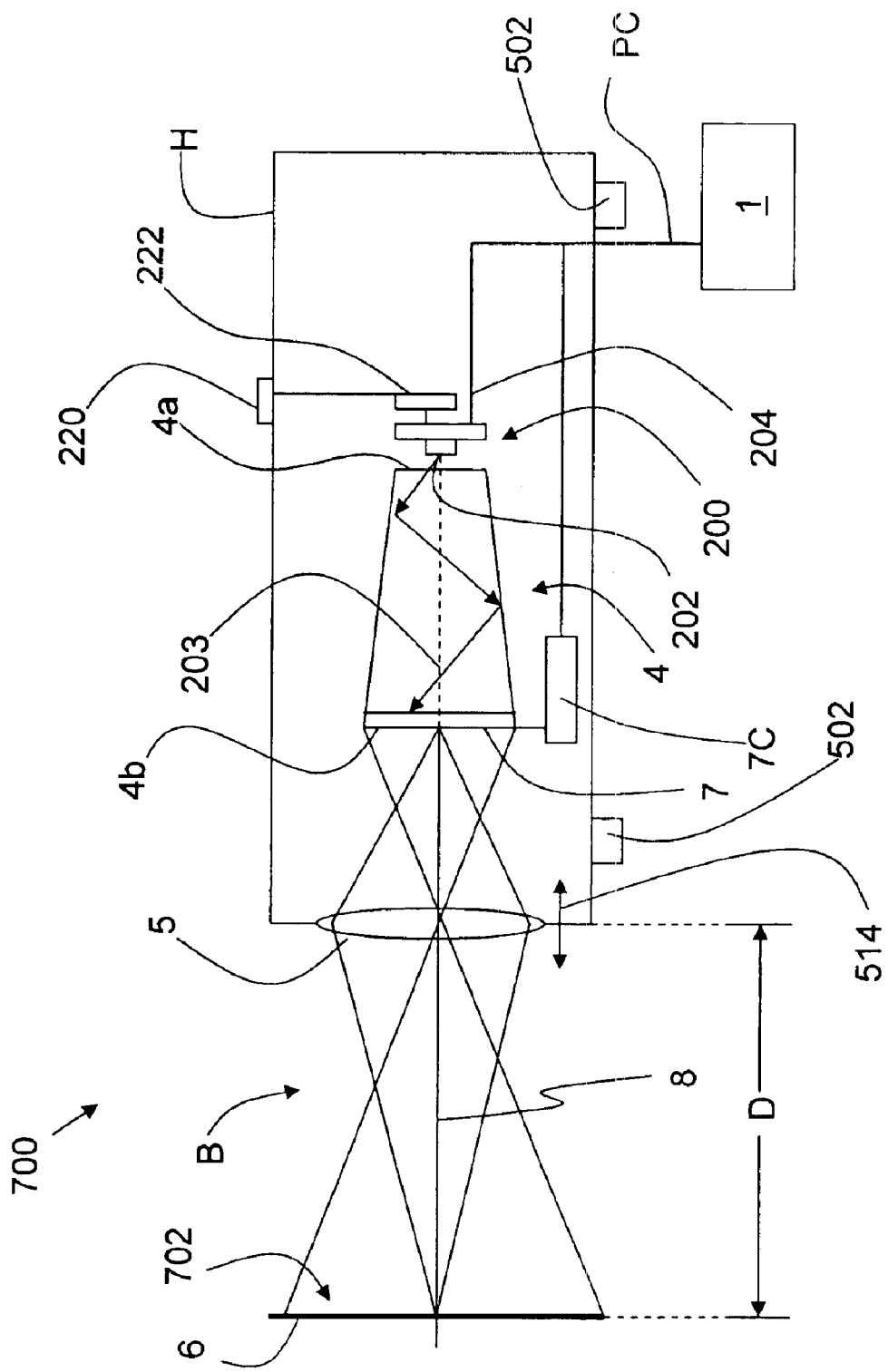
FIG. 14 is a schematic diagram of an example embodiment of an optical projector based on a variation of the flashlight embodiment as described above in connection with FIG. 3.

FIG. 14 is a schematic diagram of an example embodiment similar to the flashlight as described above in connection with FIG. 3, but modified for use as an optical projector 700. The example embodiment of optical projector 700 shown in FIG. 14 includes a single on-axis LED 202 in LED array 200, though generally LED array 200 can include one or more LEDs. In optical projector 700, mask 7 is spatially adjustable, e.g., is in the form of a spatial light modulator, such as a liquid crystal device (LCD) pixilated spatial light modulator (SLM) or similar light-modifying component. Spatially adjustable mask 7 is coupled to a controller 7C that controls the operation (i.e., the spatial modulation) of the mask. Controller 7C is in turn coupled to power source 1.

In an example embodiment, power source 1 is included within the housing H, (e.g., as one or more batteries) so that optical projector 700 can be hand-held or generally be portable (see FIG. 3). In another example embodiment, power source 1 is external to housing H, as is shown in FIG. 14.

In operation, bright and uniformized light 203 exiting light homogenizer (e.g., light pipe) 4 at output face 4b is spatially modulated by adjustable mask 7. The modulated light is projected via light beam B onto object 6 (e.g., a screen or a wall) to form a corresponding image 702 thereon. Because the illumination provided to adjustable mask 7 is bright and uniform, image 702 is a bright and accurate representation of mask 7. The position, size and focus of image 702 are adjustable by adjusting imaging lens 5. In an example embodiment, imaging lens 5 is an axially adjustable zoom lens.

In an example embodiment, optical projector 700 includes mount 502 attached to housing H. In an example embodiment, mount 502 is the form of legs or pads on one side of housing H that supports the housing on a surface (not shown), such as a table top. Mount 502 is preferably adjustable to assist in selectively directing light beam B to the object 6.

The foregoing disclosure and description of the various embodiments of the work light invention are for the purpose of illustration and explanation, and changes thereto may be made without departing from the spirit and scope of the invention as defined in the appended claims.

What is claimed is:

1. A work light for uniformly illuminating an object, comprising:
   a light source;
   a light homogenizer arranged to receive light from the light source at an input face and adapted to output uniformized light at an output face, wherein the light homogenizer includes at least one of i) a light pipe and ii) one or more lens arrays;
   an imaging lens arranged adjacent the output face to create a light beam that forms an image of the output face on the object as a uniform beam spot at a selectable distance from the imaging lens;
   a housing that houses the light source, the light homogenizer and the imaging lens;
   a mount attached to the housing and adapted to movably support the housing so as to selectively direct the light beam to the object.

2. The work light of claim 1, wherein the light source is one selected from the group of light sources comprising: a conventional flashlight bulb, one or more light emitting diode, a laser, and an arc lamp.

3. The work light of claim 1, wherein imaging lens is adjustable relative to the output face to adjust the beam spot.

4. The work light of claim 1, further including a power cord adapted to connect the work light to a source of power external to the housing so as to provide power to the light source.

5. The work light of claim 1, further including a power source located within the housing and operably coupled to the light source.

6. The work light of claim 1, wherein the mount includes:
   an adjustable arm having first and second ends, with the first end connected to the housing and the second end connected to a support member.

7. The work light of claim 6, wherein support member is one selected from the group of support members consisting of: a movable base and a fixed region.

8. The work light of claim 1, wherein the mount includes an adjustable headband that allows the work light to be used as a head lamp.

9. The work light of claim 1, wherein the work light is as used as a dentist light, wherein the object is a mouth of a person.

10. The work light of claim 1, wherein the work light is incorporated into a vehicle for use as a headlight.

11. The work light of claim 1, wherein the work light is mounted in or to a fixed region and used as a reading lamp.

12. An projector, comprising:
   a light source;
   a light homogenizer arranged to receive light from the light source at an input face and adapted to output uniformized light at an output face, wherein the light homogenizer includes at least one of i) a light pipe and ii) one or more lens arrays;
   a spatially adjustable mask arranged at the output face and adapted to spatially modulate light exiting the output face of the light homogenizer; and
   an imaging lens arranged to receive the spatially modulated light and create a light beam therefrom that forms an image of the spatially adjustable mask on the object at a selectable distance from the imaging lens.

13. The projector of claim 12, further including a controller operably coupled to the spatially adjustable mask to control the spatial modulation of light exiting the output face.

14. The projector according to claim 12, further including a housing that houses the light source, the light homogenizer, the light modulator, and the imaging lens.

15. The projector of claim 13, further including a mount attached to the housing to adjustably support the housing to assist in selectively directing the light beam to the object.

16. The projector of claim 12, wherein the spatially adjustable mask includes a liquid crystal device (LCD).

17. A method of forming a light beam to uniformly illuminate an object at a selectable distance from a work light housing, comprising:

housing a light source, a light homogenizer having at least one of i) a light tunnel and ii) one or more lens arrays, and an imaging lens with a work light housing;

attaching the work light housing to a mount adapted to support the work light housing so as to assist in selectively directing the light beam to the object;

generating light from the light source;

homogenizing the light by passing the light through the light homogenizer;

receiving with the imaging lens the homogenized light from an output face of the light homogenizer; and adjusting the imaging lens to focus the received light as the light beam to form a uniform beam spot at the object.

18. The method of claim 17, including forming the beam spot to have a sharp boundary using a mask placed adjacent the light homogenizer output face.

19. A work light for uniformly illuminating an object with a light beam, comprising:

a light pipe having an input face and output face;

one or more light-emitting diodes (LEDs) optically coupled to the light pipe input face;

an imaging lens arranged adjacent the light pipe output face and at an output end of the work light so as to create the light beam from light generated by the one or more LEDs and that exits the output face;

a housing that houses the light pipe, the one or more LEDs and the imaging lens; and a mount attached to the housing and adapted to support the housing to assist in selectively directing the light beam to the object.

20. A method of forming a light beam, comprising:

housing one or more light-emitting diodes, a light pipe and an imaging lens in operational relationship in a housing;

generating light from one or more light-emitting diodes (LEDs);

coupling the light into the light pipe and outputting uniformized light at an output face of the light pipe;

collecting the outputted light from the light pipe with an imaging lens;

directing the outputted light as the light beam; and forming a beam spot on the object using the light beam by adjusting at least one of the imaging lens and a position of the housing.

21. An optical projector method, comprising:

housing a light source, a light homogenizer, a spatially adjustable mask and an imaging lens in an operational relationship in a housing;

generating light from the light source;

receiving the light at an input face of a light homogenizer adapted to provide uniformized light at an output face, wherein the light homogenizer includes i) a light pipe or ii) one or more lens arrays;

spatially modifying the uniformized light at the output face with the spatially adjustable mask; and imaging light from the spatially adjustable mask using the imaging lens, thereby creating a light beam that forms an image of the spatially adjustable mask on the object at a selectable distance from the imaging lens.

22. The method of claim 21, including:

mounting the housing to a mount; and adjusting the mount to adjust the position of the image relative to the object.

* * * * *